United States Patent
Ruan et al.

(10) Patent No.: US 6,633,212 B1
(45) Date of Patent: *Oct. 14, 2003

(54) ELECTRONICALLY LATCHING MICRO-MAGNETIC SWITCHES AND METHOD OF OPERATING SAME

(75) Inventors: Meichun Ruan, Tempe, AZ (US); Jun Shen, Phoenix, AZ (US); Charles Wheeler, Paradise Valley, AZ (US)

(73) Assignee: Arizona State University, Tempe, AR (US)

( * ) Notice: Subject to any disclaimer, the term of this patent is extended or adjusted under 35 U.S.C. 154(b) by 22 days.

This patent is subject to a terminal disclaimer.

(21) Appl. No.: 09/799,831

(22) Filed: Mar. 6, 2001

Related U.S. Application Data

(60) Division of application No. 09/563,595, filed on May 3, 2000, which is a continuation-in-part of application No. 09/496,446, filed on Feb. 2, 2000
(60) Provisional application No. 60/155,757, filed on Sep. 23, 1999.

(51) Int. Cl.[7] .................................................. H01H 51/22
(52) U.S. Cl. ........................ 335/78; 257/414; 369/112; 359/290; 200/181
(58) Field of Search ................ 335/78–86, 124, 335/128; 257/414, 421, 531; 200/180–181; 369/112; 359/290

(56) References Cited

U.S. PATENT DOCUMENTS

| | | |
|---|---|---|
| 4,065,677 A | 12/1977 | Micheron et al. |
| 4,461,968 A | 7/1984 | Kolm et al. |
| 4,570,139 A | 2/1986 | Kroll |
| 5,016,978 A | 5/1991 | Fargette et al. |
| 5,398,011 A | 3/1995 | Kimura et al. |
| 5,472,539 A | 12/1995 | Saia et al. |
| 5,475,353 A | 12/1995 | Roshen et al. |
| 5,629,918 A * | 5/1997 | Ho et al. ..................... 369/112 |
| 5,696,619 A * | 12/1997 | Knipe et al. ................ 359/224 |
| 5,784,190 A * | 7/1998 | Worley ........................ 359/291 |
| 5,818,316 A | 10/1998 | Shen et al. |
| 5,838,847 A | 11/1998 | Pan et al. |
| 5,847,631 A | 12/1998 | Taylor et al. |

(List continued on next page.)

FOREIGN PATENT DOCUMENTS

| | | |
|---|---|---|
| DE | 19 820821 C | 12/1999 |
| EP | 0 780 858 A | 6/1997 |
| EP | 0 869 519 A | 10/1998 |
| JP | 06251684 A | 9/1994 |
| WO | 97 39468 A | 10/1997 |
| WO | 98 34269 A | 8/1998 |
| WO | 99 27548 A | 6/1999 |

OTHER PUBLICATIONS

Chin H. Ahn and Mark G. Allen, "A Fully Integrated Micromagnetic Actuator With a Multilevel Meander Magnetic Actuator with a Multilevel Meander Magnetic Core", Jun. 1992, IEEE Solid–State SEnsor and Actuator Workshop, pp. 14–17.

(List continued on next page.)

Primary Examiner—Lincoln Donovan
(74) Attorney, Agent, or Firm—Ingrassia Fisher & Lorenz

(57) ABSTRACT

A switch with an open state and a closed state suitably includes a cantilever having first and second state corresponding to the open and closed states of the switch, respectively. The switch may also include a magnet configured to provide an electromagnetic field that maintains said cantilever in one of the first and second states. Various embodiments may also include an electrode or electrical conductor configured to provide an electric potential or electromagnetic pulse, as appropriate, to switch the cantilever between the first and second states. Various embodiments may be formulated with micromachining technologies, and may be formed on a substrate.

7 Claims, 13 Drawing Sheets

U.S. PATENT DOCUMENTS

| | | | | |
|---|---|---|---|---|
| 5,898,515 | A | * | 4/1999 | Furlani et al. ............... 359/290 |
| 5,945,898 | A | | 8/1999 | Judy et al. |
| 6,016,092 | A | | 1/2000 | Qiu et al. |
| 6,028,689 | A | | 2/2000 | Michalicek et al. |
| 6,078,016 | A | * | 6/2000 | Yoshikawa et al. ......... 200/181 |
| 6,084,281 | A | | 7/2000 | Fullin et al. |
| 6,094,116 | A | | 7/2000 | Tai et al. |
| 6,124,650 | A | | 9/2000 | Bishop et al. |
| 6,143,997 | A | | 11/2000 | Feng et al. |
| 6,160,230 | A | | 12/2000 | McMillan et al. |

OTHER PUBLICATIONS

William P. Taylor and Mark G. Allen, "Integrated Nagnetic Microrelays: Mormally Open, Normally Closed, and Multi–Pole Devices", Jun. 1997, IEEE International Conference on Solid–State Sensors and Actuators, pp. 1149–1152.

Jack W. Judy and Richard S. Muller "Magneticall Actuated, Addressable Microstructures", Sep. 1997, Journal of Microelectromichanical Systems, vol. 6, No. 3, Sep. 1997, pp. 249–255.

John A> Wright and Yu–Chong Tai, "Micro–Miniature Electromatnetic Switches Fabricated Using MEMS Technology", 46th Annual International Relay Conference: NARM '98, Apr. 1998.

John A. Wright, Yu–Chong Tai and Gerald Lilienthal, "A Magnetostatic MEMS Switch for DC Brushless Motor Communication", Solid State Source and Actuator Workshop 1998, Jun. 1998.

Laure K. Lagorce, Oliver Brand, and Mark G. Allen, "Magnetic Microacturators Based on Polymer Magnets", IEEE Journal of Microelectromechanical Systems, vol. 8, No. 1, Mar. 1999, pp. 2–9.

E. Fullin, J. Gobet, HAC Tilmans, and J. Bergqvist, "A New Basic Technology for Magnetic Micro–Acturators", pp. 143–147 (No date).

"P10D Electricity & Magnetism Lecture 14", Internet Source: http://scitec.uwhichill.edu.bb/cmp/online/P10D/Lecture 14/lect14.htm, Jan. 3, 2000, pp 1–5.

Richard P. Feynman, "There's Plenty of Room at the Bottom", Dec. 29, 1959, pp. 1–12, Internet Source: http://222.zyvex.com/nanotech/feynman.html.

William Trimmer, "The Scaling of Micromechanical Devices", Sensors and Actuators, VOl 19, No. 3, Sep. 1989, pp. 267–287, taken from the Internet Source: http://home.e-arthlink.net/–trimmerw/mems/scale.html.

William P. Taylor, Oliver Brand, and Mark G. Allen, "Fully Integrated Magnetically Actuated Micromachined Relays", Journal of Microelectromechanical Systems, vol. 7, No. 2, Jun. 1998, pp. 181–191.

John A. Wright, Yu–Chong Tai, and Shih–Chia Chang, "A Large–Force, Fully–Integrated MEMS Magnetic Actuator", 1997 International Conference on Solid–State Sensors and Actuators, Chicago, Jun. 1997, pp. 793–796.

Tilmans, et al., "A Fully–Packaged Electromagnetic Microrelay", IEEE 1999, pp. 25–30 (No date).

Xi–Qing Sun, KR Farmer, WN Carr, "A Bistable Microrelay Based on Two–Segment Multimorph Cantilever Actuators", 1998 IEEE, pp. 154–159 (No month).

Ezekiel JJ Kruglick and Kristofer SJ Pister, "Bistable MEMS Relays and Contact Characterization", Hilton Head 98 and 19th International Conference on Electric Contact Phenomena, 5 pgs. (No date).

"Ultraminiatore Magneti cLatching to 5–relays SPDT DC TO C Band", Serices RF 341, product information from Teledyne Relays, 1998 (No month).

* cited by examiner

FIG.2A
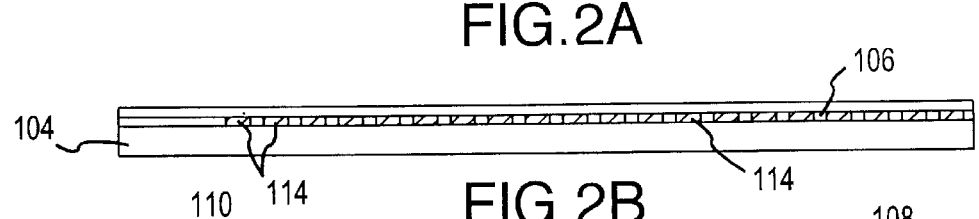
FIG.2B
FIG.2C
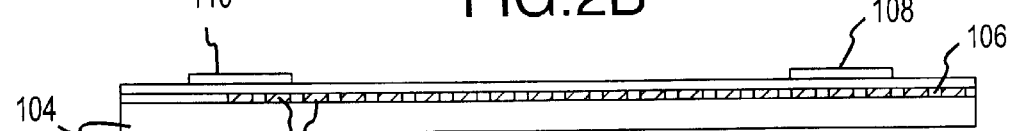
FIG.2D
FIG.2E
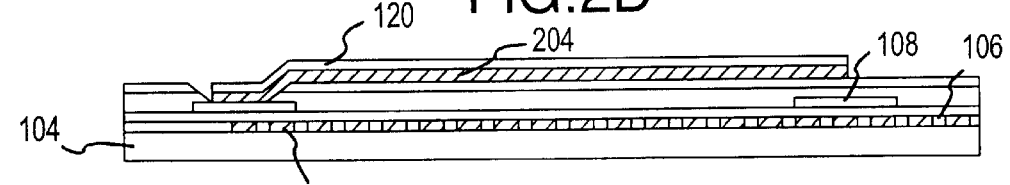
FIG.2F
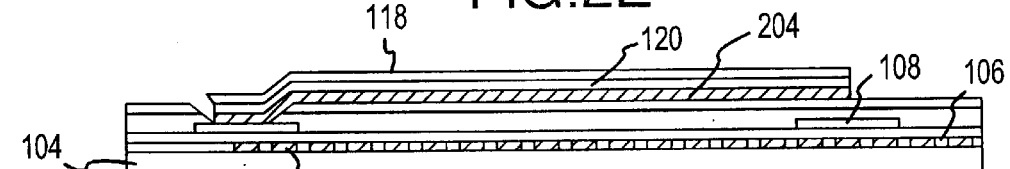
FIG.2G
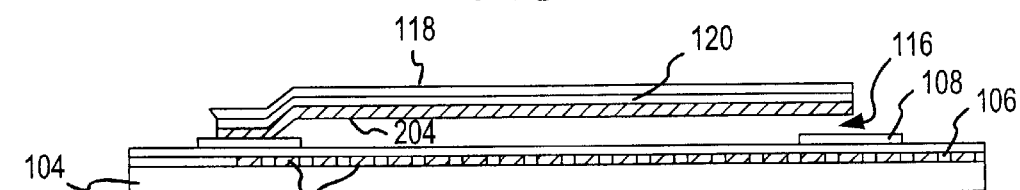
FIG.2H
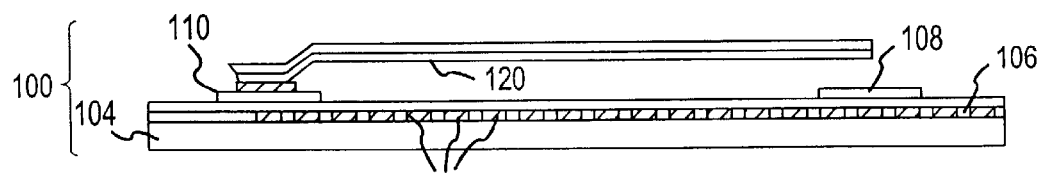

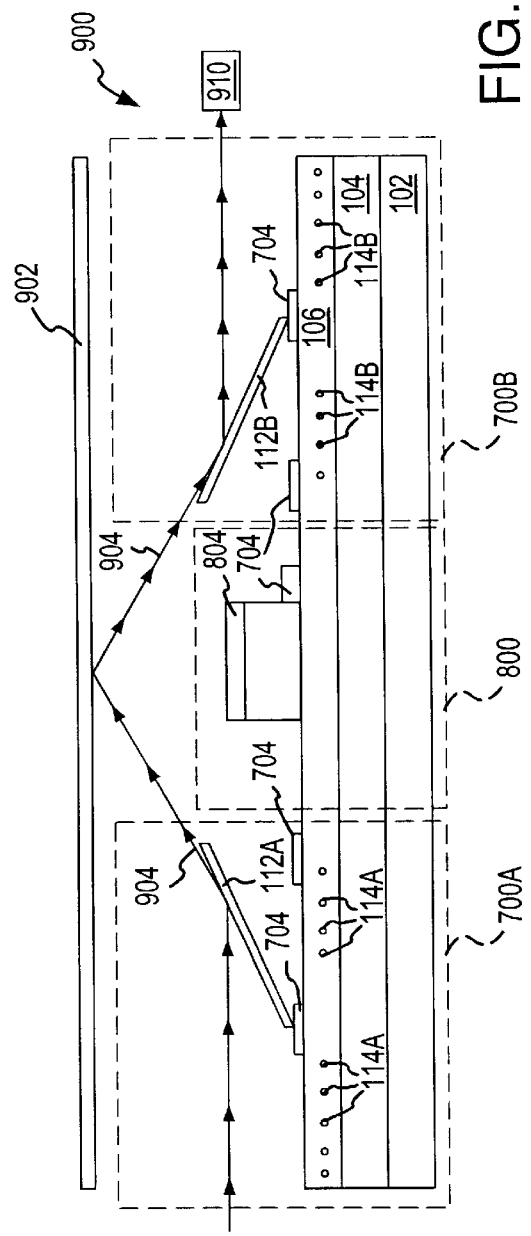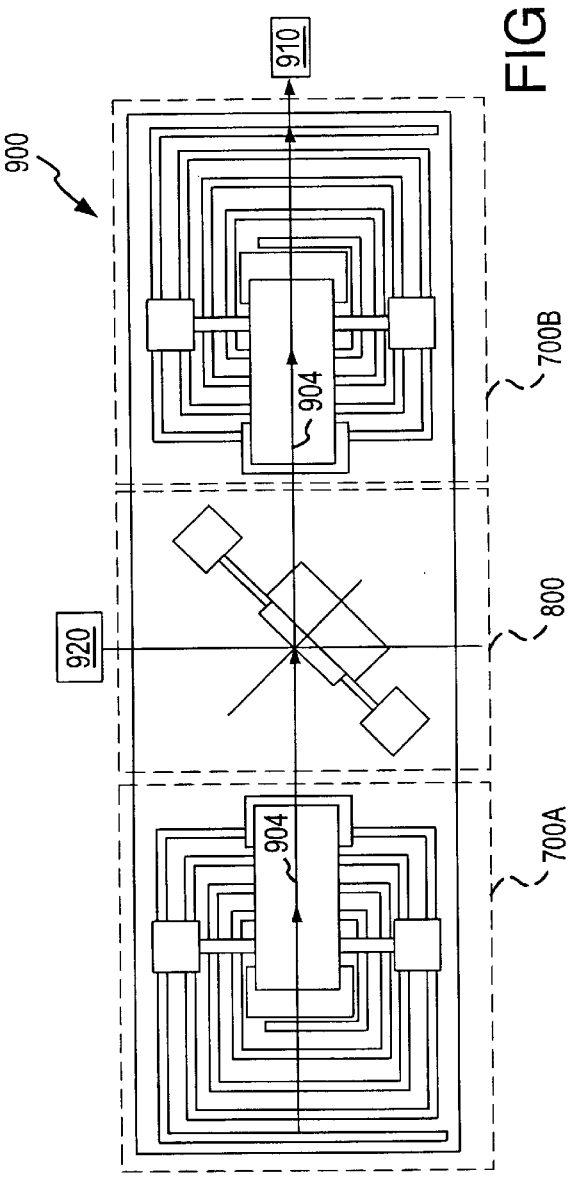

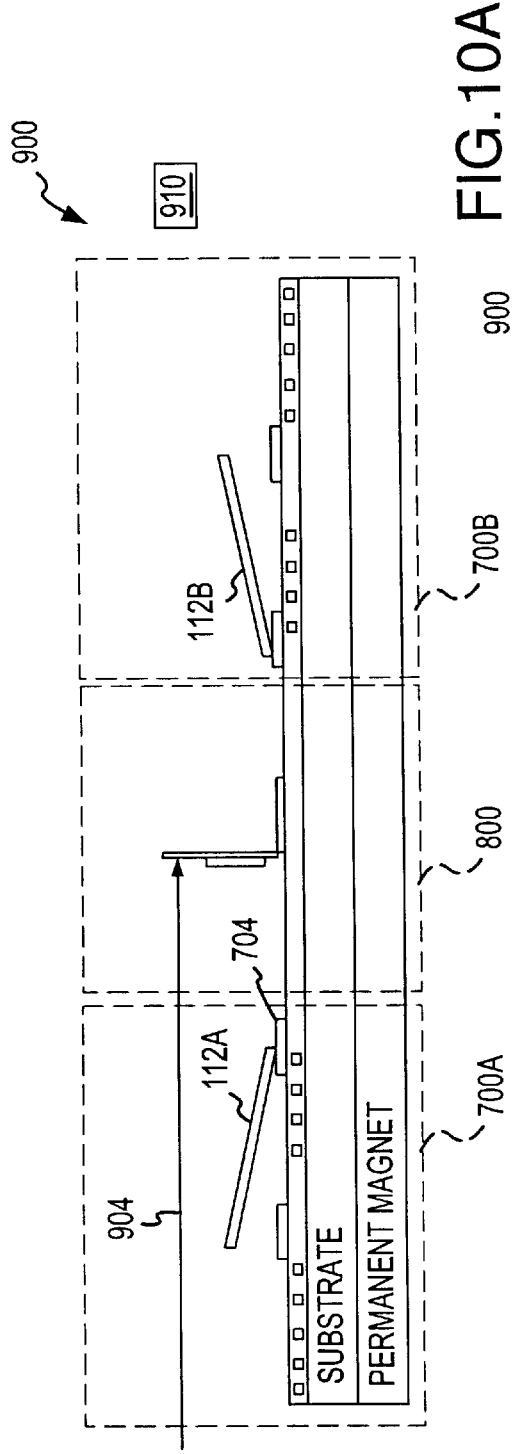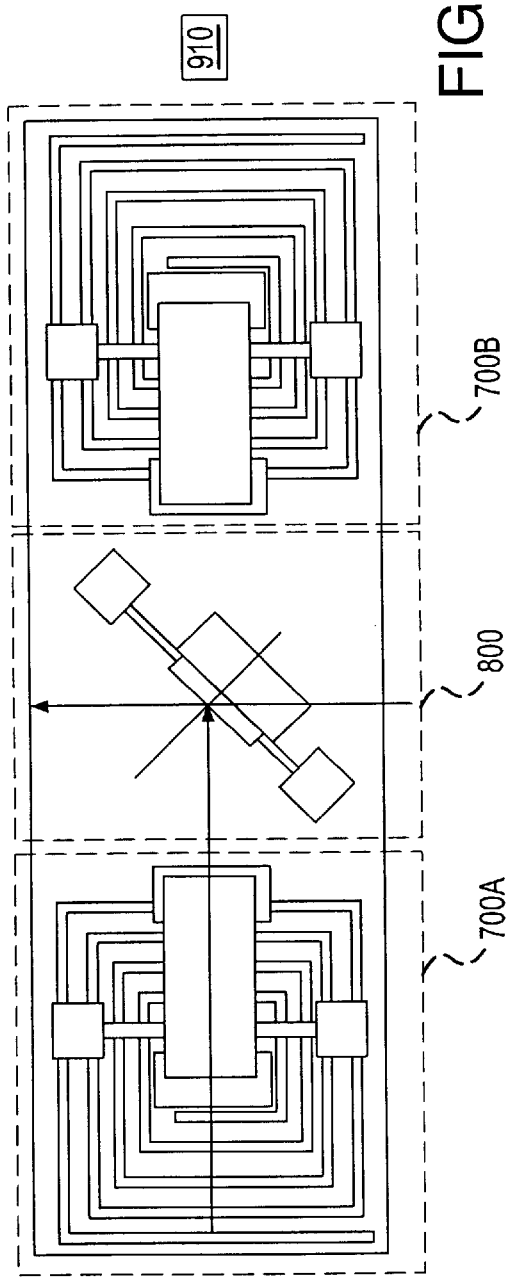

ELECTRONICALLY LATCHING MICRO-MAGNETIC SWITCHES AND METHOD OF OPERATING SAME

STATEMENT OF RELATED APPLICATIONS

This application is divisional application of U.S. Ser. No. 09/563,595 filed May 3, 2000, which is a continuation-in-part of U.S. Ser. No. 09/496,446 file date Feb. 2, 2000 which claims priority of Provisional Application Ser. No. 60/155,757 filed Sep. 23, 1999.

FIELD OF THE INVENTION

The present invention relates to electronic and optical switches. More specifically, the present invention relates to latching micro-magnetic switches with low power consumption and to methods of formulating and operating micro-magnetic switches.

BACKGROUND OF THE INVENTION

Switches are typically electrically controlled two-state devices that open and close contacts to effect operation of devices in an electrical or optical circuit. Relays, for example, typically function as switches that activate or de-activate portions of electrical, optical or other devices. Relays are commonly used in many applications including telecommunications, radio frequency (RF) communications, portable electronics, consumer and industrial electronics, aerospace, and other systems. More recently, optical switches (also referred to as "optical relays" or simply "relays" herein) have been used to switch optical signals (such as those in optical communication systems) from one path to another.

Although the earliest relays were mechanical or solid-state devices, recent developments in micro-electro-mechanical systems (MEMS) technologies and microelectronics manufacturing have made micro-electrostatic and micro-magnetic relays possible. Such micro-magnetic relays typically include an electromagnet that energizes an armature to make or break an electrical contact. When the magnet is de-energized, a spring or other mechanical force typically restores the armature to a quiescent position. Such relays typically exhibit a number of marked disadvantages, however, in that they generally exhibit only a single stable output (i.e. the quiescent state) and they are not latching (i.e. they do not retain a constant output as power is removed from the relay). Moreover, the spring required by conventional micro-magnetic relays may degrade or break over time.

Another micro-magnetic relay is described in U.S. Pat. No. 5,847,631 issued to Taylor et al. on Dec. 8, 1998, the entirety of which is incorporated herein by reference. The relay disclosed in this reference includes a permanent magnet and an electromagnet for generating a magnetic field that intermittently opposes the field generated by the permanent magnet. Although this relay purports to be bi-stable, the relay requires consumption of power in the electromagnet to maintain at least one of the output states. Moreover, the power required to generate the opposing field would be significant, thus making the relay less desirable for use in space, portable electronics, and other applications that demand low power consumption.

A bi-stable, latching switch that does not require power to hold the states is therefore desired. Such a switch should also be reliable, simple in design, low-cost and easy to manufacture, and should be useful in optical and/or electrical environments.

BRIEF DESCRIPTION OF THE DRAWING FIGURES

The above and other features and advantages of the present invention are hereinafter described in the following detailed description of illustrative embodiments to be read in conjunction with the accompanying drawing figures, wherein like reference numerals are use to identify the same or similar parts in the similar views, and:

FIGS. 1A and 1B are side and top views, respectively, of an exemplary embodiment of a switch;

FIGS. 2A–H are side views showing an exemplary technique for manufacturing a switch;

FIGS. 9A and 9B are side and top views of an exemplary switch in a first state;

FIGS. 10A and 10B are side and top views of an exemplary switch in a second state.

DESCRIPTION OF EXEMPLARY EMBODIMENTS

It should be appreciated that the particular implementations shown and described herein are examples of the invention and are not intended to otherwise limit the scope of the present invention in any way. Indeed, for the sake of brevity, conventional electronics, manufacturing, MEMS technologies and other functional aspects of the systems (and components of the individual operating components of the systems) may not be described in detail herein. Furthermore, for purposes of brevity, the invention is frequently described herein as pertaining to a micro-electronically-machined relay for use in electrical or electronic systems. It should be appreciated that many other manufacturing techniques could be used to create the relays described herein, and that the techniques described herein could be used in mechanical relays, optical relays or any other switching device. Further, the techniques would be suitable for application in electrical systems, optical systems, consumer electronics, industrial electronics, wireless systems, space applications, or any other application. Moreover, it should be understood that the spatial descriptions (e.g. "above", "below", "up", "down", etc.) made herein are for purposes of illustration only, and that practical latching relays maybe spatially arranged in any orientation or manner. Arrays of these relays can also be formed by connecting them in appropriate ways and with appropriate devices.

A Latching Switch

Figure 1A:
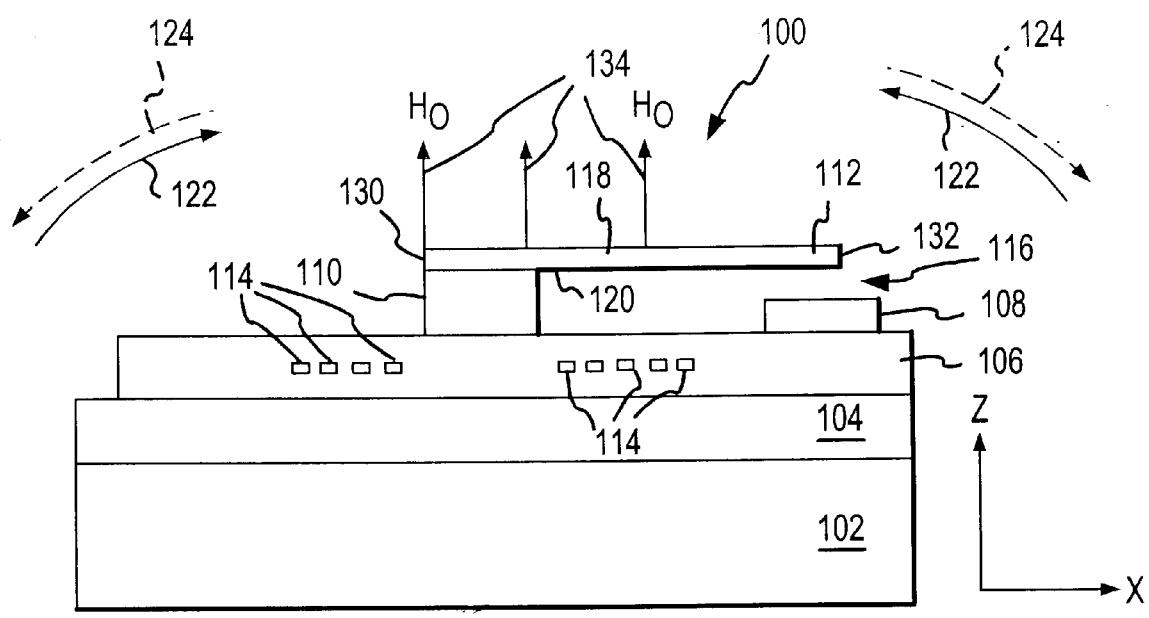
Figure 1B:
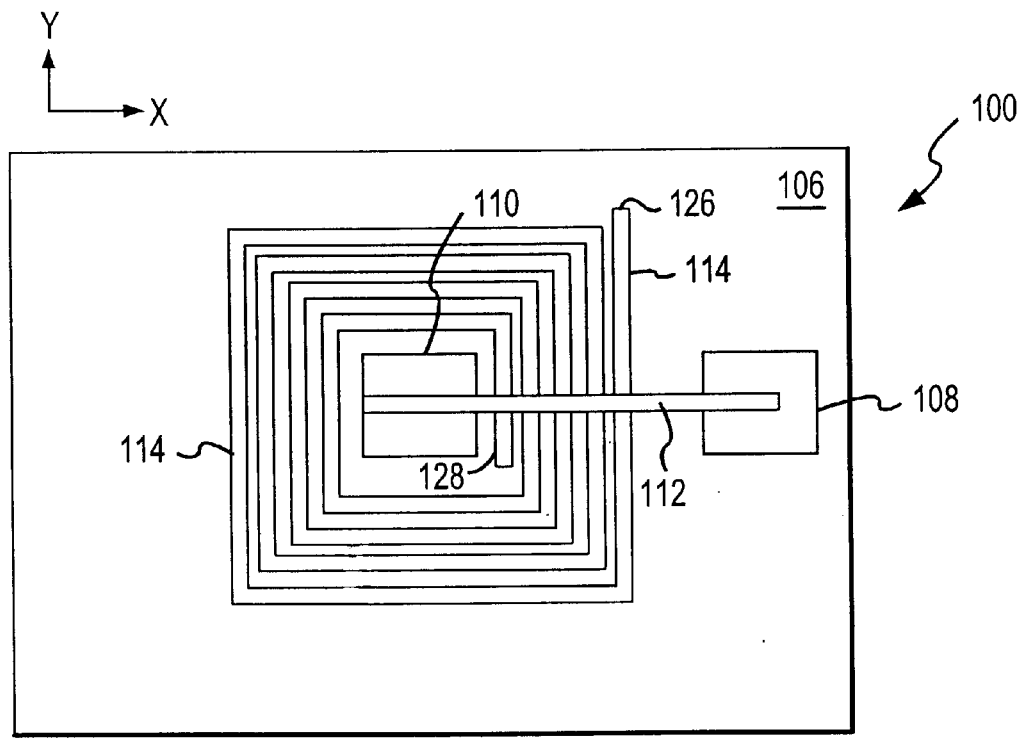

FIGS. 1A and 1B show side and top views, respectively, of a latching switch. With reference to FIGS. 1A and 1B, an exemplary latching relay 100 suitably includes a magnet 102, a substrate 104, an insulating layer 106 housing a conductor 114, a contact 108 and a cantilever 112 positioned above substrate by a staging layer 110.

Magnet 102 is any type of magnet such as a permanent magnet, an electromagnet, or any other type of magnet capable of generating a magnetic field $H_o$ 134, as described more fully below. In an exemplary embodiment, magnet 102 is a Model 59-P09213T001 magnet available from the Dexter Magnetic Technologies corporation of Fremont, Calif., although of course other types of magnets could be used. Magnetic field 134 may be generated in any manner and with any magnitude, such as from about 1 Oersted to $10^4$ Oersted or more. In the exemplary embodiment shown in FIG. 1, magnetic field $H_o$ 134 may be generated approximately parallel to the Z axis and with a magnitude on the order of about 370 Oersted, although other embodiments will use varying orientations and magnitudes for magnetic field 134. In various embodiments, a single magnet 102 may be used in conjunction with a number of relays 100 sharing a common substrate 104.

Substrate 104 is formed of any type of substrate material such as silicon, gallium arsenide, glass, plastic, metal or any other substrate material. In various embodiments, substrate 104 may be coated with an insulating material (such as an oxide) and planarized or otherwise made flat. In various embodiments, a number of latching relays 100 may share a single substrate 104. Alternatively, other devices (such as transistors, diodes, or other electronic devices) could be formed upon substrate 104 along with one or more relays 100 using, for example, conventional integrated circuit manufacturing techniques. Alternatively, magnet 102 could be used as a substrate and the additional components discussed below could be formed directly on magnet 102. In such embodiments, a separate substrate 104 may not be required.

Insulating layer 106 is formed of any material such as oxide or another insulator such as a thin-film insulator. In an exemplary embodiment, insulating layer is formed of Probimide 7510 material. Insulating layer 106 suitably houses conductor 114. Conductor 114 is shown in FIGS. 1A and 1B to be a single conductor having two ends 126 and 128 arranged in a coil pattern. Alternate embodiments of conductor 114 use single or multiple conducting segments arranged in any suitable pattern such as a meander pattern, a serpentine pattern, a random pattern, or any other pattern. Conductor 114 is formed of any material capable of conducting electricity such as gold, silver, copper, aluminum, metal or the like. As conductor 114 conducts electricity, a magnetic field is generated around conductor 114 as discussed more fully below.

Cantilever 112 is any armature, extension, outcropping or member that is capable of being affected by magnetic force. In the embodiment shown in FIG. 1A, cantilever 112 suitably includes a magnetic layer 118 and a conducting layer 120. Magnetic layer 118 may be formulated of permalloy (such as NiFe alloy) or any other magnetically sensitive material. Conducting layer 120 may be formulated of gold, silver, copper, aluminum, metal or any other conducting material. In various embodiments, cantilever 112 exhibits two states corresponding to whether relay 100 is "open" or "closed", as described more fully below. In many embodiments, relay 100 is said to be "closed", when a conducting layer 120 connects staging layer 110 to contact 108. Conversely, the relay may be said to be "open" when cantilever 112 is not in electrical contact with contact 108. Because cantilever 112 may physically move in and out of contact with contact 108, various embodiments of cantilever 112 will be made flexible so that cantilever 112 can bend as appropriate. Flexibility may be created by varying the thickness of the cantilever (or its various component layers), by patterning or otherwise making holes or cuts in the cantilever, or by using increasingly flexible materials. Alternatively, cantilever 112 can be made into a "hinged" arrangement such as that described below in conjunction with FIG. 3. Although of course the dimensions of cantilever 112 may vary dramatically from implementation to implementation, an exemplary cantilever 112 suitable for use in a micro-magnetic relay 100 may be on the order of 10–1000 microns in length, 1–40 microns in thickness, and 2–600 microns in width. For example, an exemplary cantilever in accordance with the embodiment shown in FIG. 1 may have dimensions of about 600 microns×10 microns×50 microns, or 1000 microns×600 microns×25 microns, or any other suitable dimensions.

Contact 108 and staging layer 110 are placed on insulating layer 106, as appropriate. In various embodiments, staging layer 110 supports cantilever 112 above insulating layer 106, creating a gap 116 that may be vacuum or may become filled with air or another gas or liquid such as oil. Although the size of gap 116 varies widely with different implementations, an exemplary gap 116 may be on the order of 1–100 microns, such as about 20 microns. Contact 108 may receive cantilever 112 when relay 100 is in a closed state, as described below. Contact 108 and staging layer 110 may be formed of any conducting material such as gold, gold alloy, silver, copper, aluminum, metal or the like. In various embodiments, contact 108 and staging layer 110 are formed of similar conducting materials, and the relay is considered to be "closed" when cantilever 112 completes a circuit between staging layer 110 and contact 108. Other embodiments use different formulations for contact 108 and staging layer 110, such as those discussed below in conjunction with FIGS. 3 and 4. In certain embodiments wherein cantilever 112 does not conduct electricity, staging layer 110 may be formulated of non-conducting material such as Probimide material, oxide, or any other material. Additionally, alternate embodiments may not require staging layer 110 if cantilever 112 is otherwise supported above insulating layer 106.

Principle of Operation

In a broad aspect of the invention, magnet 102 generates a magnetic field $H_o$ 126 that induces a magnetization (m) in cantilever 112. The magnetization suitably creates a torque on cantilever 112 that forces cantilever 112 toward contact 108 or away from contact 108, depending upon the direction of the magnetization, thus placing relay 100 into an open or closed state. The direction of magnetization in cantilever 112 may be adjusted by a second magnetic field generated by conductor 114 as appropriate, and as described more fully below.

With continued reference to FIGS. 1A and 1B, magnetic field $H_o$ 134 may be applied by magnet 102 primarily in the direction parallel to the Z-axis such that the field is perpendicular to the primary dimension (e.g. the length) of cantilever 112. Magnetic field 134 suitably induces a magnetization in cantilever 112, which may be made of soft magnetic material. Because of the geometry of cantilever 112, the magnetization in cantilever 112 suitably aligns along the long axis of the cantilever, which is the length of cantilever 112 (parallel to the X-axis) in FIG. 1.

The orientation of the magnetization in cantilever 112 is suitably dependent upon the angle (alpha) between the applied magnetic field 134 and the long axis of cantilever 112. Specifically, when the angle (alpha) is less than 90 degrees, the magnetic moment (m) in cantilever 112 points from end 130 of cantilever 112 toward end 132. The interaction between the magnetic moment and magnetic field $H_o$ 134 thus creates a torque in a counter-clockwise direction about end 130 of cantilever 112 that moves end 132 upward, as appropriate, thus opening the circuit between staging layer 110 and contact 108. Conversely, when the angle (alpha) is greater than 90 degrees, the magnetic moment (m) in cantilever 112 points from end 132 toward end 130, creating a clockwise torque about end 130. The clockwise torque moves end 132 downward to complete the circuit between staging layer 110 and contact 108. Because the magnetization (m) of cantilever 112 does not change unless the angle (alpha) between the long axis of cantilever 112 and the applied magnetic field 134 changes, the applied torque will remain until an external perturbation is applied. Elastic torque of the cantilever or a stopper (such as the contact) balances the applied magnetic torque, and thus relay 100 exhibits two stable states corresponding to the upward and downward positions of cantilever 112 (and therefore to the open and closed states, respectively, of relay 100).

Switching may be accomplished by any suitable technique that reverses the direction of the cantilever's magnetic dipole moment. In an exemplary embodiment, switching may be accomplished by generating a second magnetic field that has a component along the long axis of cantilever 112 that is strong enough to affect the magnetization (m) of cantilever 112. In a the embodiment shown in FIG. 1, the relevant component of the second magnetic field is the component of the field along the X-axis. Because the strength of the second magnetic field along the long axis of cantilever 112 is of primary concern, the overall magnitude of the second magnetic field is typically significantly less than the magnitude of magnetic field 134 (although of course fields of any strength could be used in various embodiments). An exemplary second magnetic field may be on the order of 20 Oersted, although of course stronger or weaker fields could be used in other embodiments.

The second magnetic field may be generated through, for example, a magnet such as an electronically-controlled electromagnet. Alternatively, the second magnetic field may be generated by passing a current through conductor 114. As current passes through conductor 114, a magnetic field is produced in accordance with a "right-hand rule". For example, a current flowing from point 126 to point 128 on conductor 114 (FIG. 1B) typically generates a magnetic field "into" the center of the coil shown, corresponding to field arrows 122 in FIG. 1A. Conversely, a current flowing from point 128 to point 126 in FIG. 1 generates a magnetic field flowing "out" of the center of the coil shown, corresponding to dashed field arrows 124 in FIG. 1A. The magnetic field may loop around the conductor 114 in a manner shown also in FIG. 1A, imposing a horizontal (X) component of the magnetic field on the cantilever 112.

By varying the direction of the current or current pulse flowing in conductor 114, then, the direction of the second magnetic field can be altered as desired. By altering the direction of the second magnetic field, the magnetization of cantilever 112 may be affected and relay 100 may be suitably switched open or closed. When the second magnetic field is in the direction of field arrows 122, for example, the magnetization of cantilever 112 will point toward end 130. This magnetization creates a clockwise torque about end 130 that places cantilever 112 in a "down" state that suitably closes relay 100. Conversely, when the second magnetic field is in the direction of dashed field arrows 124, the magnetization of cantilever 112 points toward end 132, and a counter-clockwise torque is produced that places cantilever 112 in an "up" state that suitably opens relay 100. Hence, the "up" or "down" state of cantilever 112 (and hence the "open" or "closed" state of relay 100) may be adjusted by controlling the current flowing through conductor 114. Further, since the magnetization of cantilever 112 remains constant without external perturbation, the second magnetic field may be applied in "pulses" or otherwise intermittently as required to switch the relay. When the relay does not require a change of state, power to conductor 114 may be eliminated, thus creating a bi-stable latching relay 100 without power consumption in quiescent states. Such a relay is well suited for applications in space, aeronautics, portable electronics, and the like.

Manufacturing a Latching Relay

FIG. 2 includes a number of side views showing an exemplary technique for manufacturing a latching relay 100. It will be understood that the process disclosed herein is provided solely as an example of one of the many techniques that could be used to formulate a latching relay 100.

An exemplary fabrication process suitably begins by providing a substrate 102, which may require an optional insulating layer. As discussed above, any substrate material could be used to create a latching relay 100, so the insulating layer will not be necessary if, for example, an insulating substrate is used. In embodiments that include an insulating layer, the layer may be a layer of silicon dioxide ($SiO_2$) or other insulating material that may be on the order of 1000 angstroms in thickness. Again, the material chosen for the insulating material and the thickness of the layer may vary according to the particular implementation.

With reference to FIG. 2A, conductor 114 is suitably formed on substrate 104. Conductor 114 may be formed by any technique such as deposition (such as e-beam deposition), evaporation, electroplating or electroless plating, or the like. In various embodiments, conductor 114 is formed in a coil pattern similar to that shown in FIG. 1. Alternatively, conductor 114 is formed in a line, serpentine, circular, meander, random or other pattern. An insulating layer 106 may be spun or otherwise applied to substrate 104 and conductor 114 as shown in FIG. 2B. Insulating layer 106 may be applied as a layer of photoresist, silicon dioxide, Probimide-7510 material, or any other insulating material that is capable of electrically isolating the top devices. In various embodiments, the surface of the insulating material is planarized through any technique such as chemical-mechanical planarization (CMP).

Contact pads 108 and 110 may be formed on insulating layer 106 through any technique such as photolithography, etching, or the like (FIG. 2C). Pads 108 and 110 may be formed by depositing one or more layers of conductive material on insulating layer 106 and then patterning the pads by wet etching, for example. In an exemplary embodiment, pads 108 and 110 suitably include a first layer of chromium (to improve adhesion to insulating layer 106) and a second layer of gold, silver, copper, aluminum, or another conducting material. Additional metal layers may be added to the contacts by electroplating or electroless plating methods to improve the contact reliability and lower the resistance.

With reference to FIG. 2D, the contact pads 108 and 110 may be suitably covered with a layer of photoresist, aluminum, copper, or other material to form sacrificial layer 202. An opening 206 in sacrificial layer 202 over the cantilever base areas may be defined by photolithography, etching, or another process. Cantilever 112 may then be formed by depositing, sputtering or otherwise placing one or more layers of material on top of sacrificial layer 202 and extending over the opening 206, as shown in FIG. 2E. In an exemplary embodiment, a base layer 204 of chromium or another metal may be placed on sacrificial layer 202 to improve adhesion, and one or more conducting layers 120 may be formed as well. Layers 204 and 120 may be formed by, for example, deposition followed by chemical or mechanical etching. Layer 120 may be thickened by adding another conductor layer (such as gold, gold alloy, etc.) by electroplating or electroless plating methods. Cantilever 112 is further formed by electroplating or otherwise placing a layer 118 of permalloy (such as NiFe permalloy) on top of conducting layer 120, as shown in FIG. 2F. The thickness of the permalloy layer 118 may be controlled by varying the plating current and time of electroplating. Electroplating at 0.02 amperes per square centimeters for a period of 60 minutes, for example, may result in an exemplary permalloy layer thickness of about 20 microns. In various embodiments, an additional permalloy layer 306 (shown in FIG. 3) may be electroplated on top of cantilever 112 to increase the responsiveness of cantilever 112 to magnetic fields.

With reference to FIG. 2G, sacrificial layer 202 may be removed by, for example, wet or dry (i.e. oxygen plasma) releasing techniques to create gap 116 between cantilever 112 and insulating layer 106. In various embodiments, adhesion layer 204 is removed using a suitable etching or equivalent removal technique to form relay 100 (FIG. 2H). Relay 100 may then be diced, packaged with magnet 102 (shown in FIG. 1), or otherwise processed as appropriate. It should be understood that the permanent magnet 102 can alternatively be fabricated directly on the substrate, placed on top of the cantilever, or the coil and the cantilever can be fabricated directly on a permanent magnet substrate.

Alternate Embodiments of Latching Relays

FIGS. 3 and 4 disclose alternate embodiments of latching relays 100. FIGS. 3A and 3B show side and top views, respectively, of an alternate embodiment of a latching relay that includes a hinged cantilever 112. The perspective of FIGS. 3A and 3B is rotated 90 degrees in the X-Y plane from the perspective shown in FIGS. 1A and 1B to better show the detail of the hinged cantilever. With reference to FIGS. 3A and 3B, a hinged cantilever 112 suitably includes one or more strings 302 and 304 that support a magnetically sensitive member 306 above insulating layer 106. Member 306 may be relatively thick (on the order of about 50 microns) compared to strings 302 and 304, which may be formed of conductive material. As with the relays 100 discussed above in conjunction with FIG. 1, relays 100 with hinged cantilevers may be responsive to magnetic fields such as those generated by magnet 102 and conductor 114.

In various embodiments, one or both of strings 302 and 304 are in electrical communication with contact pad 108 when the relay is in a "closed" state. Of course, any number of strings could be used. For example, a single string could be formulated to support the entire weight of member 306. Additionally, the strings may be located at any point on member 306. Although FIG. 3 shows strings 302 and 304 near the center of member 306, the strings could be located near the end of member 306 toward contact 108 to increase the torque produced by magnet 102, for example.

Figure 3A:
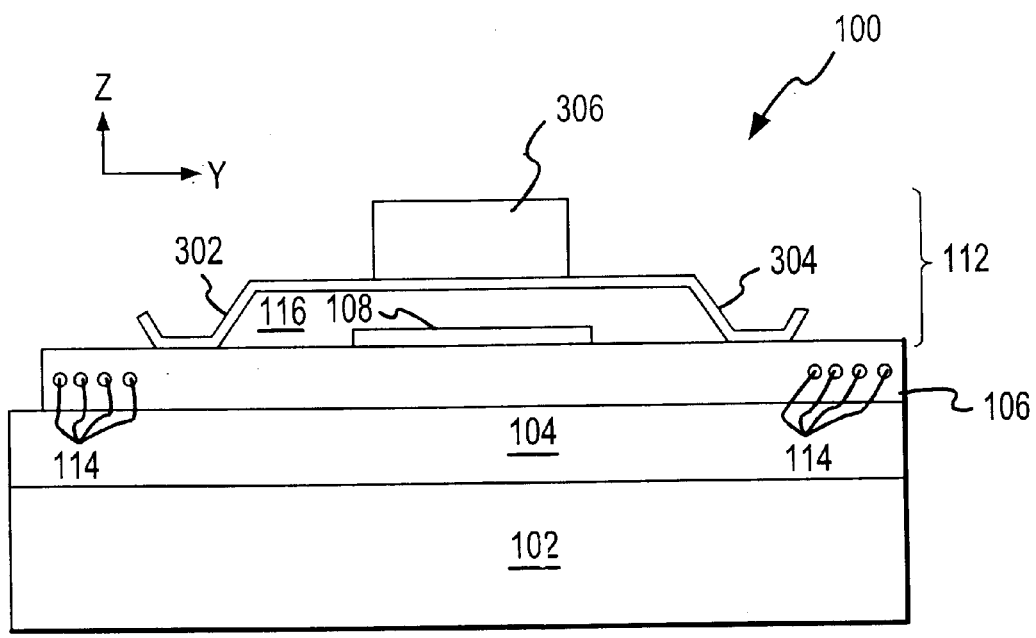
FIGS. 3A and 3B are side views and top views, respectively, of a second exemplary embodiment of a switch.
Figure 3B:
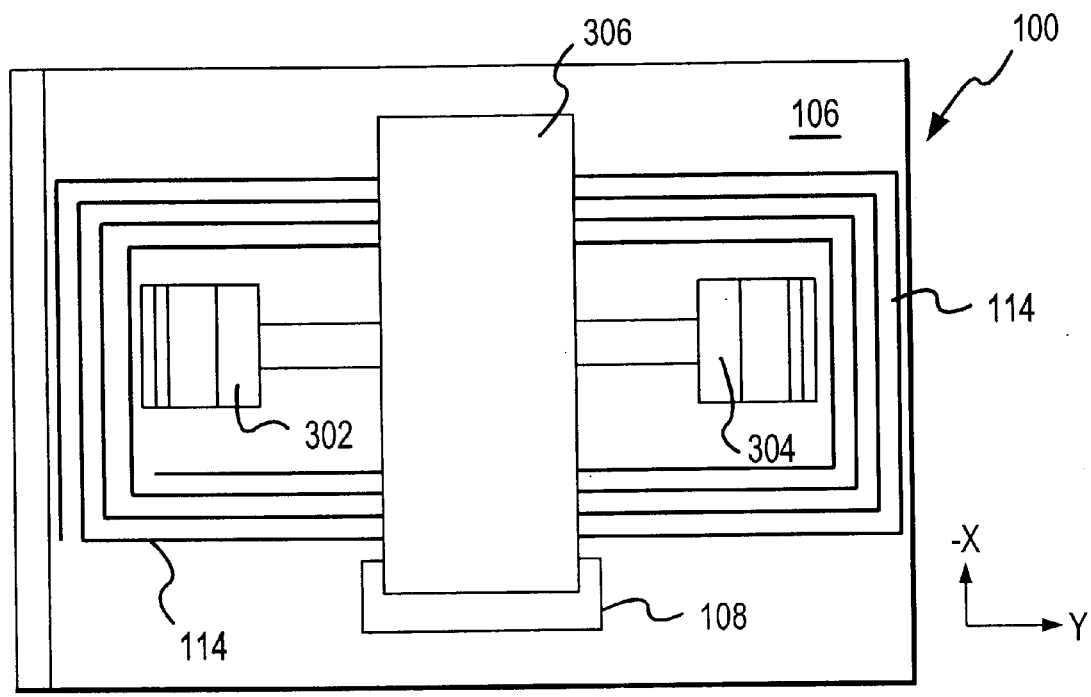
Figure 3C:
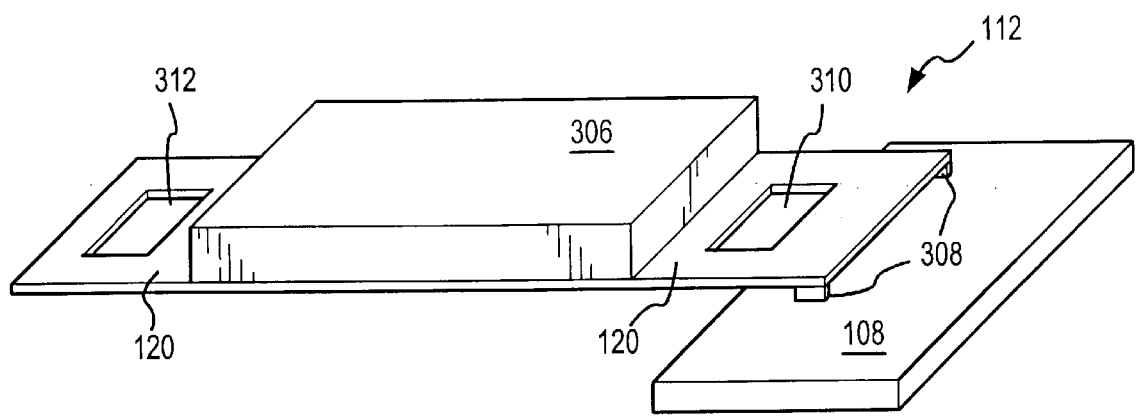
FIG. 3C is a perspective view of an exemplary cantilever suitable for use with the second exemplary embodiment of a switch.

FIG. 3C is a perspective view of an exemplary cantilever 112 suitable for use with the embodiments shown in FIGS. 3A and 3B, as well as other embodiments. Cantilever 112 suitably includes member 306 coupled to conducting layer 120. Holes 310 and/or 312 may be formed in conducting layer 120 to improve flexibility of cantilever 112, and optional contact bumps 308 may be formed on the surface of conducting layer 120 to come into contact with contact 108. Strings 302 and 304 (not shown in FIG. 3C) may be affixed or otherwise formed on cantilever 112 at any position (such as in the center of conducting layer 120 or at either end of conducting layer 120) as appropriate. Alternatively, the strings may be formed of non-conducting materials and cantilever 112 may provide a conducting path between two separate conductors touched simultaneously by the cantilever in the closed state, as discussed below.

Figure 3D:
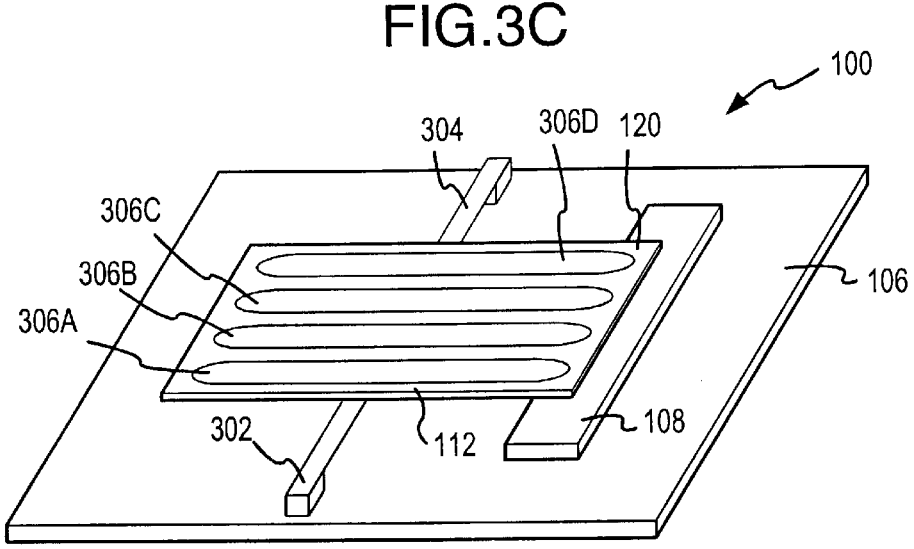
FIG. 3D is a perspective of an exemplary embodiment of a switch that includes sectionalize magnetically sensitive members.
Figure 3E:
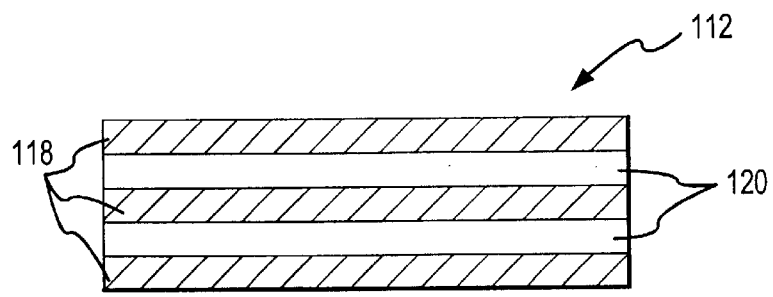
FIG. 3E is a perspective of an exemplary cantilever that includes multiple magnetically sensitive layers.

It has been observed that certain switches that include relatively wide magnetically sensitive members 306 may exhibit reduced magnetization because of the relatively large ratio of the width-to-length of cantilever 112. Moreover, the increased width may lead to increased magnetization along the width of cantilever 112, which may result in twisting of the cantilever and degraded contact between cantilever 112 and contact 108. FIG. 3D is a perspective view of a switch that includes sectionalized magnetically sensitive members 306A, 306B, 306C and 306D. To improve the magnetization along the length of cantilever 112, the magnetically sensitive member 306 may be sectionalized so that the magnetization of each member 306A–D is maximized along the length of the member instead of the width. Sectionalization may be accomplished by separately forming (e.g. electroplating) each member 306A–D on conducting layer 120, for example, or by etching (or otherwise forming) gaps in a single electroplated layer 306. Of course any number of magnetically sensitive sections 306A–D could be used with various embodiments, and the size of each section will vary from embodiment to embodiment. For example, various exemplary cantilevers 112 could be fashioned with four members 306A–D of about 1000×600×25 micrometers, with eight members of about 1000×50×25 micrometers (spaced about 25 micrometers apart), with fifteen members of about 1000×20×25 micrometers (spaced about 25 micrometers apart), or with any number of members having any dimensions. In various embodiments, interlinks of magnetic material, metal or any other material may be added between the members 306A–D to strengthen cantilever 112. FIG. 3E is a schematic of a cantilever 112 that has been formed with multiple layers. In an exemplary embodiment, cantilever 112 includes alternating layers of magnetic material 118 (such as permalloy) and conducting material 120, as shown in FIG. 3E, although of course other materials could be used in place of or in addition to the materials shown. Multi-layered cantilevers may be formed by sputtering, depositing, or otherwise forming multiple layers as discussed, for example, in connection with FIGS. 2E and 2F above, or through any other technique. Multi-layered cantilevers may also be sectionalized, as described above, and may be used in conjunction with any of the various embodiments of the invention.

Figure 4A:
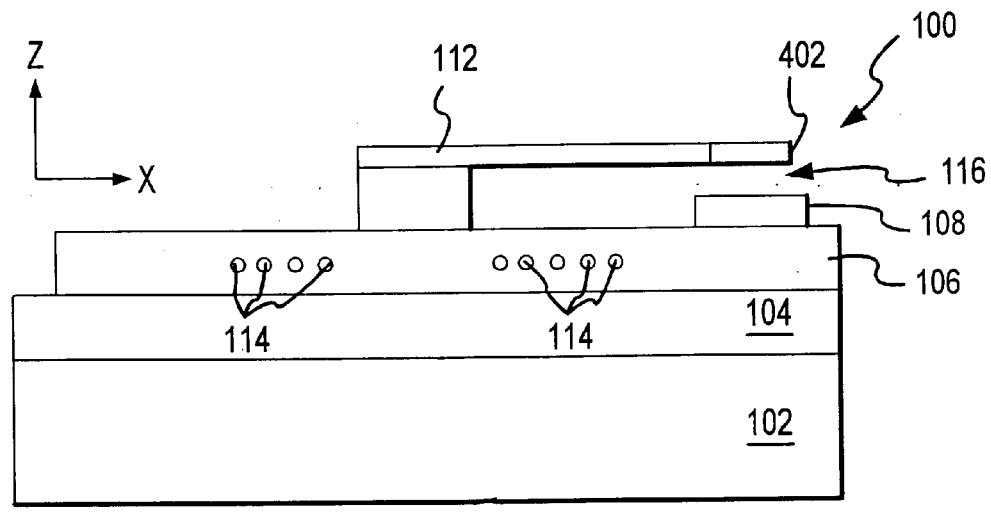
FIGS. 4A and 4B are exemplary side and top views of a third exemplary embodiment of a latching relay.
Figure 4B:
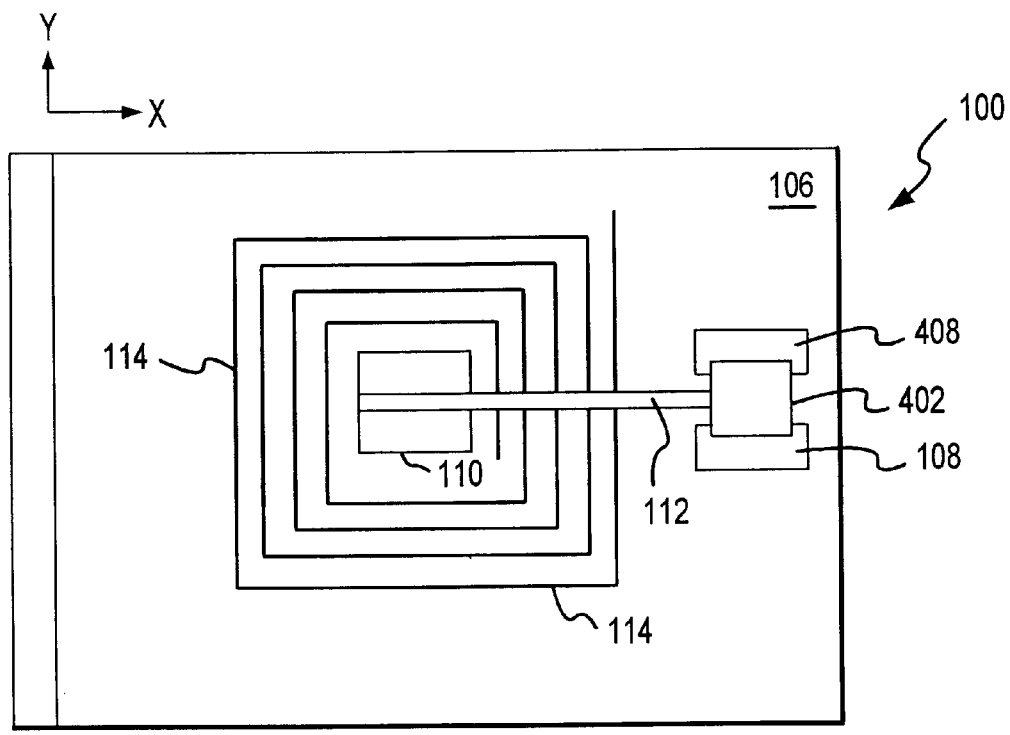
Figure 4C:
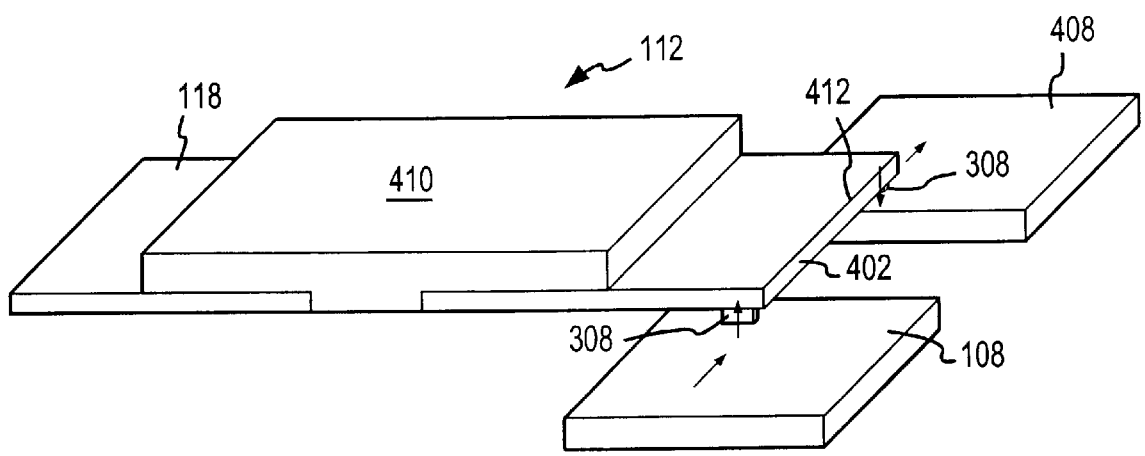
FIGS. 4C and 4D are perspective views of exemplary cantilevers suitable for use with the third exemplary embodiment of a latching relay.
Figure 4D:
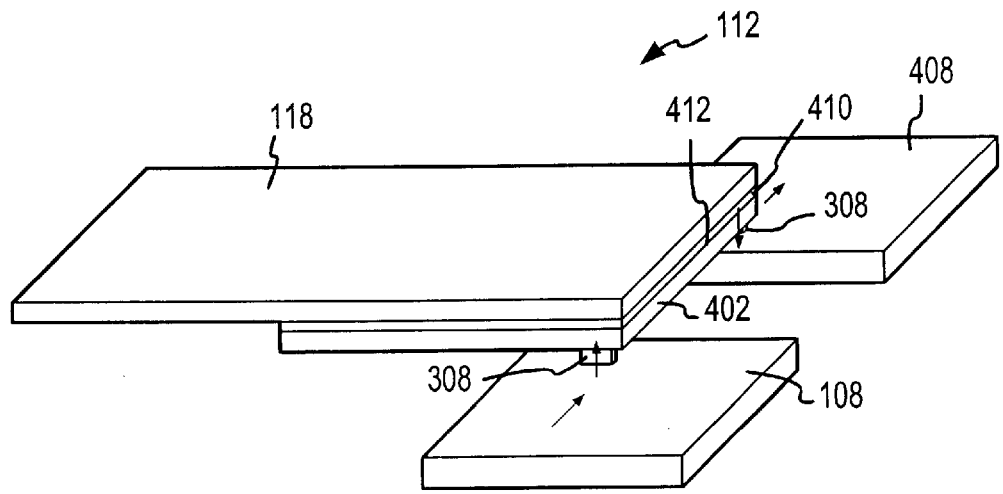

FIGS. 4A and 4B are side and top views, respectively, of an alternate embodiment of a latching relay 100. As shown in the Figure, various embodiments of cantilever 112 may not directly conduct electricity from staging layer 110 to contact 108. In such embodiments, a conducting element 402 may be attached to cantilever 112 to suitably provide electrical contact between contacts 108 and 408 when relay 100 is in a "closed" state. FIGS. 4C and 4D are perspective views of alternate exemplary embodiments of cantilever 112. In such embodiments, cantilever 112 may include a magnetically sensitive portion 118 separated from a conducting portion 402 by an insulating layer 410, which may be a dielectric insulator, for example. Optional contact bumps 308 may also be formed on conducting portion 402 as shown. When cantilever 112 is in a state corresponding to the "closed" state of relay 100, current may follow the path shown by arrows 412 between contact pads 108 and 408, as appropriate.

Figure 5:
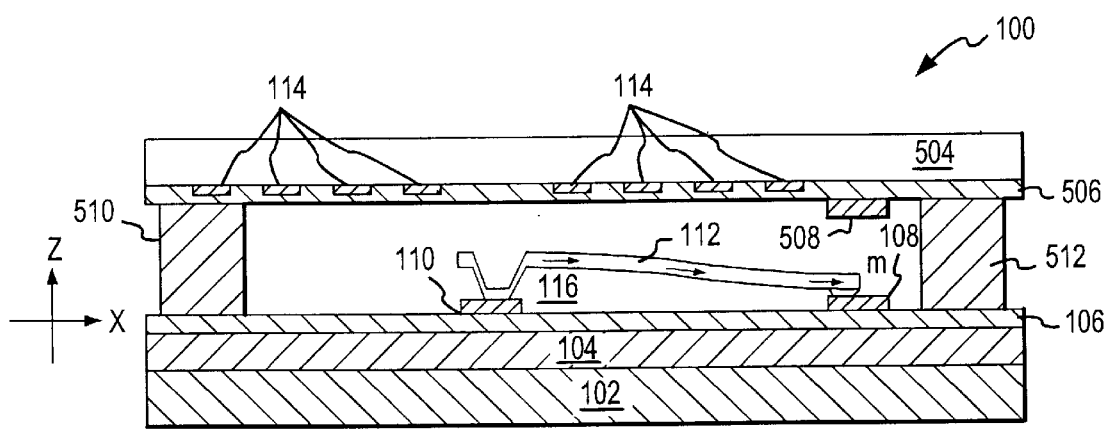
FIG. 5 is a side view of a fourth exemplary embodiment of a latching relay.

FIG. 5 is a side view of an alternate exemplary embodiment of relay 100. With reference to FIG. 5, a relay 100 may include a magnet 102, a substrate 104 and a cantilever 112 as described above (for example in conjunction with FIG. 1). In place of (or in addition to) conductor 114 formed on substrate 104, however, conductor 114 may be formed on a second substrate 504, as shown. Second substrate 504 may be any type of substrate such as plastic, glass, silicon, or the like. As with the embodiments described above, conductor 114 may be coated with an insulating layer 506, as appropriate. To create a relay 100, the various components may be formed on substrates 104 and 504, and then the substrates may be aligned and positioned as appropriate. The two substrates 104 and 504 (and the various components formed thereon) may be separated from each other by spacers such as spacers 510 and 512 in FIG. 5, which may be formed of any material.

With continued reference to FIG. 5, contact 108 may be formed on insulating layer 106, as described above. Alternatively, contact 508 may be formed on second substrate 504, as shown in FIG. 5 (of course cantilever 112 may be reformulated such that a conducting portion of cantilever 112 comes into contact with contact 508). In other embodiments, contacts 108 and 508 may both be provided such that relay 100 is in a first state when cantilever 112 is in contact with contact 108, a second state when cantilever 112 is in contact with contact 508, and/or a third state when cantilever 112 is in contact with neither contact 108 nor contact 508. Of course the general layout of relay 100 shown in FIG. 5 could be combined with any of the techniques and layouts described above to create new embodiments of relay 100.

Figure 6A:
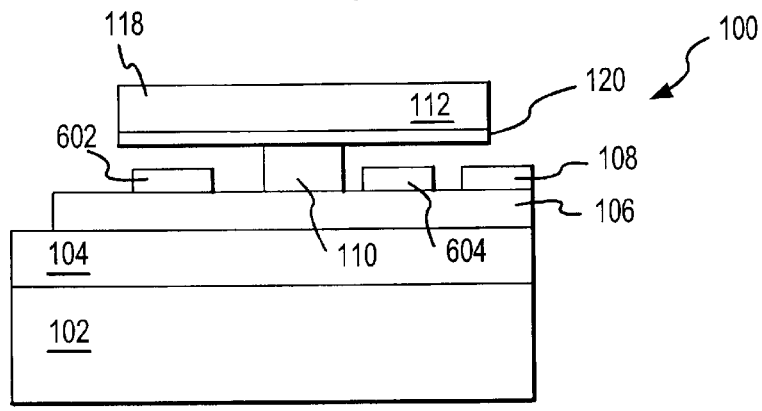
FIGS. 6A and 6B are side and top views, respectively, of a fifth exemplary embodiment of a latching relay.
Figure 6B:
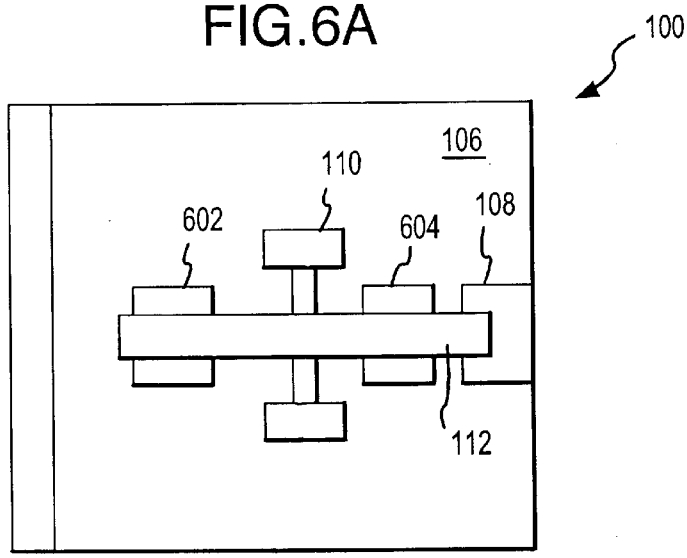

FIGS. 6A and 6B are side and top views, respectively, of an alternate embodiment of a latching relay 100. With reference now to FIGS. 6A and 6B, various embodiments of relay 100 may use electrostatic actuation to switch the state of cantilever 112 instead of magnetic energy generated by conductor 114. In such embodiments, one or more switching electrodes 602 and 604 may be deposited or otherwise fashioned on insulating layer 106. Electrodes 602 and 604 may be formed of metal or another conducting material, and may be electrically coupled to leads, wires or other connecting devices (not shown) to create an electric potential between either of the electrodes and cantilever 112.

Although FIGS. 6A and 6B show a center-hinged type cantilever 112, electrodes 602 and 604 and/or the principle of electrostatic actuation may be included in any of the relays or switches described herein in place of (or in addition to) the magnetic actuation produced by conductor 114. In various embodiments, electrodes 602 and 604 are suitably positioned with respect to cantilever 112 such that electrostatic forces generated by the two electrodes have opposing effects on cantilever 112. In the center-hinged embodiment shown in FIGS. 6A and 6B, for example, electrodes 602 and 604 may be positioned on either side of hinge 110 so that a voltage difference between electrode 602 and cantilever 112 "pushes" cantilever 112 into an "open" state. Conversely, a voltage difference between electrode 604 and cantilever 112 may "pull" cantilever 112 into a "closed" state whereby cantilever 112 is in contact with contact 108. In such embodiments, the state of cantilever 112 may be held by the magnetic field generated by permanent magnet 102, and a bistable-switch may result. The relay may be switched between stable states by providing an electric potential to the appropriate electrode to attract cantilever 112 as appropriate. In an exemplary relay 100, a hinged type cantilever 112 having dimensions of about 1000×200×20 micrometers and a supporting torsion string 110 with dimensions of 280× 20×3 micrometers may require a voltage of about 37 volts, when the overlap area between the cantilever and electrode is on the order of 200×400 square micrometers or so, to switch cantilever 112 in a permanent external magnetic field of about 200 Oersted. Again, switches or relays can be formulated with any dimensions or architectures, and the voltage required to switch between states will suitably vary from implementation to implementation. In particular, the electrostatic switching technique using electrodes 602 and 604 can be incorporated into any of the relays discussed above, or any of the switches described herein. Advantages of using electrostatic switching over magnetic switching include reduced power consumption and ease in manufacturing, since electrodes 602 and 604 can be very thin (e.g. on the order of about a hundred angstroms to about 0.5 micrometers thick). Moreover, electrostatic switches may be made to be smaller than some corresponding magnetic switches, thus reducing the overall size of the switching device. Switching control may be provided by an control device such as a microcontroller, microprocessor, application specific integrated circuit (ASIC), logic circuit, analog or digital control circuit, or the like. In an exemplary embodiment a controller provides control signals in the form of electrical signals to electrodes 602 and 604 to create voltage differences as appropriate.

It will be understood that many other embodiments of the various relays could be formulated without departing from the scope of the invention. For example, a double-throw relay could be created by adding an additional contact 108 that comes into contact with cantilever 112 when the cantilever is in its open state. Similarly, various topographies and geometries of relay 100 could be formulated by varying the layout of the various components (such as pads 108 and 110 and cantilever 112).

Optical Switches

The mechanisms, principles and techniques described above in conjunction with electrical relays may also be used to create optical switches suitable for use in communications or other optical systems. In various embodiments of an optical switch, the magnetically sensitive portion of cantilever 112 may be affixed to a mirror or other material that reflects light. As the cantilever is switched from an "open" state to a "closed" state, the reflecting surface is exposed or hidden from an optical signal such that the signal is reflected or absorbed as appropriate, and as described more fully below.

Figure 7A:
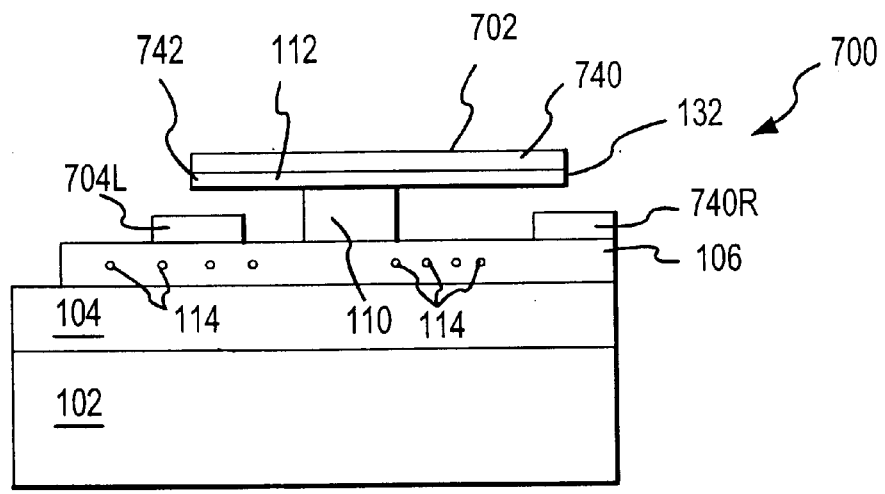
FIGS. 7A and 7B are side and top views, respectively, of an exemplary "Type I" mirror.
Figure 7B:
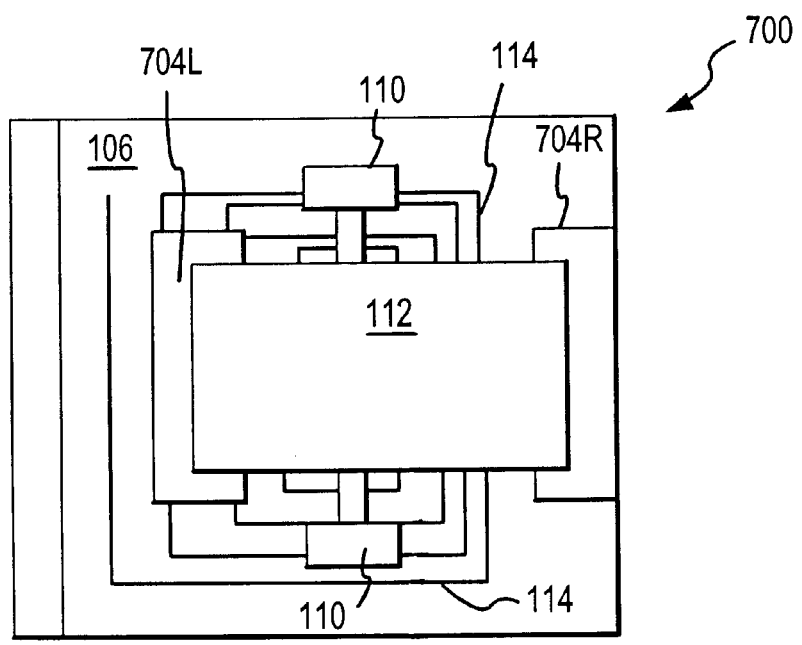

FIGS. 7A and 7B are side and top views, respectively, of an exemplary optical mirror 700 (referred to herein as a "Type I" mirror). Like the electrical switches described above, a cantilever 112 is suitably positioned over insulating layer 106 by a support string, hinge or other spacer 110. Cantilever 112 may be formed of soft magnetic material 132 (as discussed above), and may have a reflective coating 702 (such as aluminum or gold) deposited, sputtered or otherwise placed on the magnetic material. One or more optional stoppers 704 may be positioned on insulating layer 106, as appropriate, to receive and position cantilever 112 as required. Stoppers 704 may be formed of any suitable material such as etched silicon, metal, or polyimide. In various embodiments, support string 110 supports rotation of cantilever 112 into an "up" state and a "down" state, as appropriate. When cantilever 112 is in an "up" state, for example, cantilever 112 may be rotated counter-clockwise about string 110 until end 742 of cantilever 132 contacts stopper 704L. In an exemplary "down" state, cantilever 112 may be rotated clockwise about string 110 such that the end 740 of cantilever 112 contacts stopper 740R. When the right end of 132 touches the bottom stopper 704, it is in the "down". By design, the supporting string 110 may be placed closer to end 742 of cantilever 112 such that cantilever 112 may be tilted to a larger angle in the "up" position than in the "down" position. Of course, support string 110 may also be placed approximately equidistant from the ends of cantilever 112, or such that the "down" position creates a larger angle, and many orientations could be formulated in other embodiments of the invention.

Operation of optical mirror 700 may be similar to the operation of the electrical switches 100 discussed above. In various exemplary embodiments, latching and switching are accomplished by inducing a magnetic torque in cantilever 112 with conductor 114 (as shown in FIG. 7) or optional electrodes (as discussed above in connection with FIG. 6). Cantilever 112 may be stably maintained in either the "up" or "down" state through a field generated by magnet 102, as described above.

FIGS. 8A through 8G show various views and states of a second type of optical mirror 800 (referred to herein as a "Type II" mirror or "reflector"). Although these devices are primarily described herein as pertaining to reflective devices used with switches or relays, the principles and structures described herein could be used to create any sort of actuator (reflecting or non-reflecting) that may be used in any application.

Figure 8A:
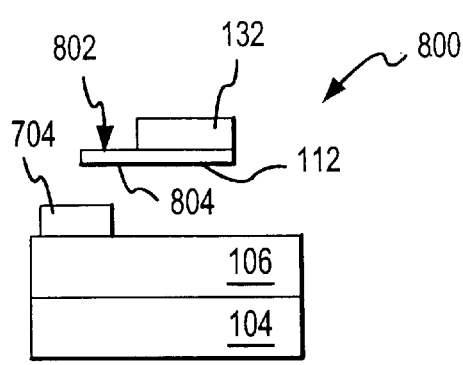
FIGS. 8A and 8B are side and top views, respectively, of an exemplary "Type II" mirror in a horizontal orientation.
Figure 8C:
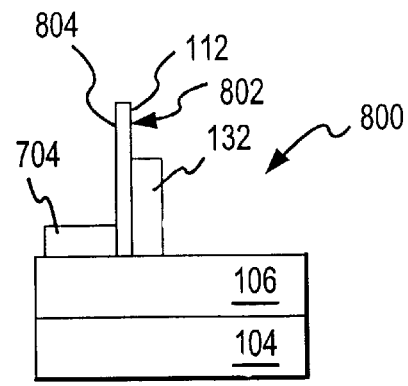
FIGS. 8C and 8D are side and top views, respectively, of an exemplary "Type II" mirror in a vertical orientation.
Figure 8B:
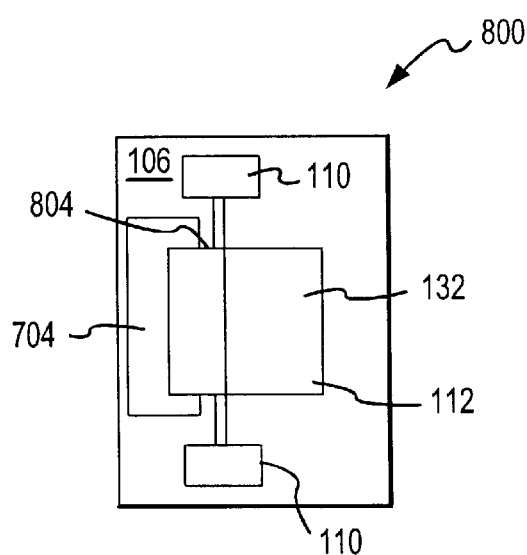

With reference to FIGS. 8A and 8B, an optical mirror 800 may include a cantilever 112 that includes a magnetically sensitive portion 132. Cantilever 112 may also include a reflective portion 804 with a reflective coating on either or both sides. In an exemplary embodiment, reflective portion 804 has a reflective coating deposited or otherwise placed on face 802, as shown in FIG. 8A. One or more stoppers 704 may also be placed on insulating layer 106 as required to position or elevate cantilever 112 as appropriate, and a support, string or hinge 110 (not shown in FIGS. 8A and 8C) may rotably fix cantilever 112 above substrate 104.

Figure 8D:
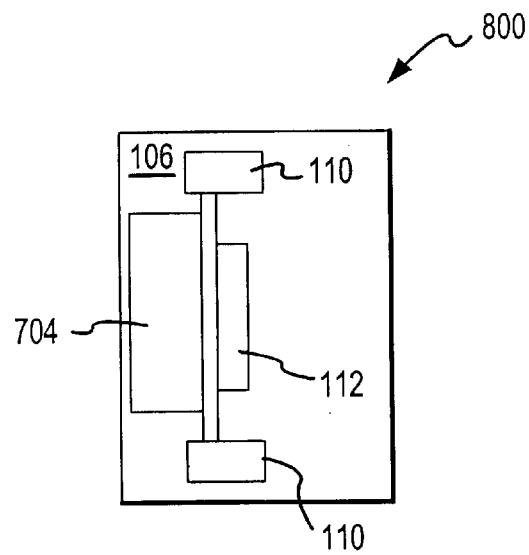

In an exemplary embodiment, string 110 supports ninety degrees of rotation between two states of cantilever 112 (plus or minus some correction for errors in manufacturing and the like). In the embodiment shown in FIGS. 8A and 8B, cantilever 112 is positioned into an "up" state by magnet 102 (not shown) to be approximately parallel to the surface of substrate 104. The "up" position may be useful when it is necessary to have a clear path for an optical beam to directly pass the Type II mirror without reflection, for example. A second "down" state of mirror 800 is shown in FIGS. 8C and 8D. Mirror 800 may be placed in the "down" state, for example, by magnet 102 (not shown) (In principle, the magnet can hold the cantilever to either of the two stable states) and/or by allowing gravity to pull the magnetically sensitive portion 132 of cantilever 112 away from the "up" position. It will be appreciated that a permanent magnet 102 and a conductor 114 may not be required for each embodiment of mirror 800, since other forces (such as force applied by optional buckling structures on stopper 704) may maintain cantilever 112 in the "down" position without requiring external forces. In many embodiments, a temporary magnetic field may be provided while the reflective coating is applied to cantilever 112 during manufacturing, and removed thereafter. In still other embodiments of mirror 800, hinge 110 and magnetically sensitive portion 132 may be eliminated and reflective portion 804 may be rigidly fixed to substrate 102 or insulating layer 104.

Figure 8E:
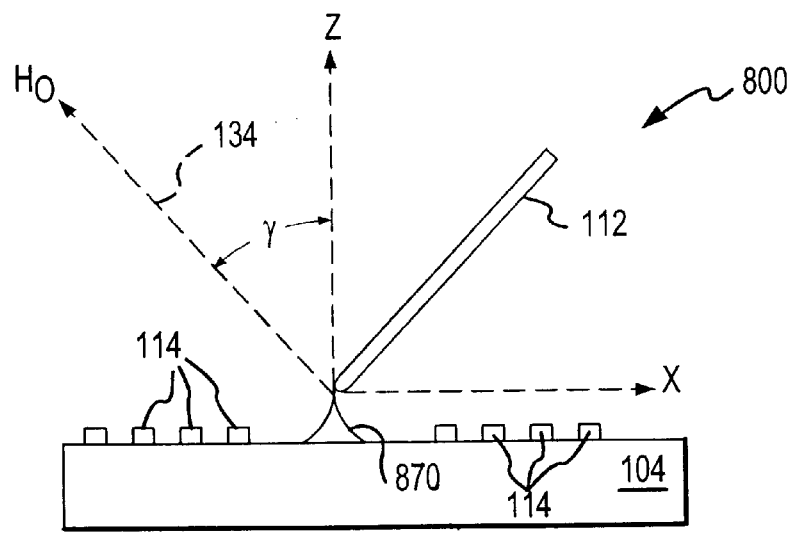
FIG. 8E is a side view of an exemplary second embodiment of a reflecting mirror.

With reference now to FIG. 8E, an alternate embodiment of a reflector 800 suitably includes a cantilever 112 and a torsion bar hinge or other anchor 870 that may be affixed to a substrate 104. A coil or other conductor 114 may also be provided, or an electrode capable of providing electrostatic attraction to cantilever 112 may be provided in an alternate embodiment. Cantilever 112 may be magnetically sensitive, as described above, and may have one or more reflective surfaces, as described above. Torsion bar hinge 870 may be implemented as one or more hinges, as described above in connection with other embodiments of switches or relays. In various embodiments, the torsion bar hinges may be located at or near the end of cantilever 112 and may be fashioned to be relatively thin and/or long with respect to cantilever 112 such that large, rotational deflections of cantilever 112 may take place without significant mechanical torque. Moreover, the direction of the external magnetic field ($H_o$) 134 applied to reflector 800 may be placed at an angle ($\gamma$) relative to a perpendicular (Z) drawn from the face of substrate 104. In the exemplary embodiment shown in FIG. 8E, for example, $\gamma$ is selected to be about 45 degrees, although other embodiments may use other angles.

The direction of magnetic field 134 suitably creates two stable positions for cantilever 112, corresponding to an "up" state and a "down" state (cantilever 112 is shown between the two states in FIG. 8E). In various embodiments, cantilever 112 may be aligned approximately perpendicular to substrate 104 in the "up" state, and approximately parallel to substrate 103 in the "down" state. A physical stopper (not shown in FIG. 8E) may be provided to maintain cantilever 112 in the desired position for the "up" and/or "down" states.

In various embodiments, a magnetic field with a magnitude of about $\chi H_o \sin(\gamma+\phi)$ Oersted or so may be provided by conductor 114 to switch cantilever 112 between states, where "$\chi$" is the magnetic susceptibility of cantilever 112 and "$\phi$" is the angle between cantilever 112 in the "down" state and the horizontal axis (X). A field of this magnitudes may suitably re-align the magnetization vector of cantilever 112, as appropriate, similar to the switching techniques discussed above, so that cantilever 112 switches between two stable states. Because the field generated by conductor 114 may be relatively weak compared to the external field 134, field 134 may be designed to be large enough to actuate device 800 but not so strong that the field generated by conductor 114 cannot reverse the magnetization vector of cantilever 112. In an exemplary embodiment, field 134 may be designed to be on the order of about 200 Oersted, although of course other field strengths could be used. The reflector 800 described herein may exhibit approximately 90 degrees or more of rotability, and consequently may have wide application beyond relays or optical switches. For example, reflectors 800 having relatively high degrees of rotability may be useful for optical projection or switch systems.

Figure 8F:
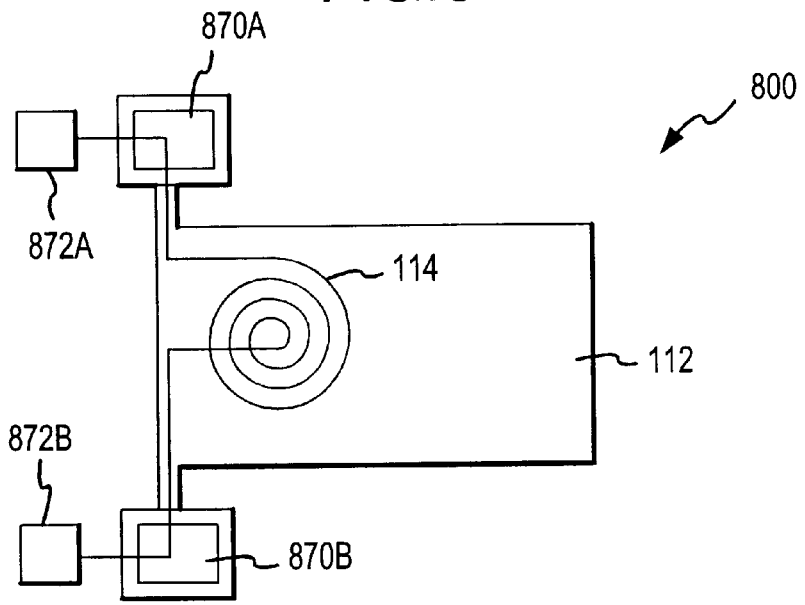
FIGS. 8F and 8G are top and side views, respectively, of an exemplary third embodiment of a reflector/mirror.
Figure 8G:
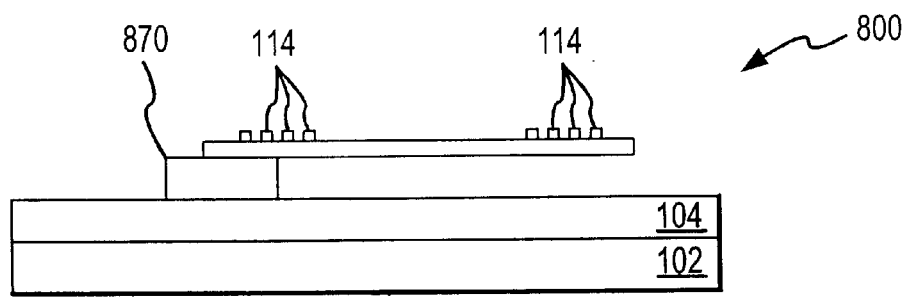

With reference now to FIGS. 8F and 8G, a third embodiment of a reflector 800 that may be used to rotate through 90 or more degrees suitably includes a conductor 114 placed on cantilever 112, which may be hingably connected to substrate 104 by a hinge 870 (shown as two torsion hinges 870A and 870B in FIG. 8F). Current may be provided to conductor 114 by electrical leads 872 (shown as leads 872A and 872B in FIG. 8F), which may be coupled to a source of electrical power. Alternatively, electrical contact with conductor 114 may be provided via conductive material (such as metal) deposited, sputtered, or otherwise placed on hinge 870. In various embodiments cantilever 112 may be made of a reflective material (such as dielectric film, polycrystalline silicon, metal, non-metals or the like), since reactions to magnetic fields may be provided by conductor 114 rather than through a magnetically sensitive material in cantilever 112. In various embodiments magnet 102 provides a magnetic field $H_o$, which may be provided perpendicular to substrate 104 or at any oblique angle, as described above in conjunction with FIG. 8E.

Actuation of reflector 800 may be accomplished by, for example, energizing conductor 114 with a current that produces a magnetic dipole moment (M) that may be perpendicular to the plane of conductor 114. The magnetic dipole moment (M) may interact with the external magnetic field supplied ($H_o$) to produce a torque (T) on cantilever 112 such that $T=M \times H_o$. The torque (T) may be controlled to switch cantilever 112 between an "up" state and a "down" state, as described above. A more detailed description of this principle used in a different context is presented in Chang Liu, T. Tsao, Y-C Tai and C-M Ho, "Surface Micromachined Magnetic Actuators", MEMS '94, Oiso, Japan, pp. 57–62(1994), incorporated herein by reference.

FIGS. 9A and 9B are side and top views, respectively, of an exemplary switch 900 that includes two type I mirrors 700A and 700B and one type II mirror/reflector 800. The axis of mirror 800 may be rotated 45 degrees (or to any other angle) from the axes of mirrors 700A and 700B as best seen in FIG. 9B. An optional reflective layer 902 (such as a mirror) may be provided in various embodiments to reflect optical signals, as discussed more fully below. In various embodiments of the invention, an optical signal (such as a pulse or beam of light) 904 is to be switched to one of two outputs 910 and 920. In the first state of switch 900 (shown in FIGS. 9A and 9B), cantilevers 112A and 112B of mirrors 700A and 700B may be placed in the "up" position so that optical signal 904 reflects off of reflective surface 702 (FIG. 7), as shown. Reflective layer 902 suitably transmits optical signal 904 between mirror 700A and 700B, bypassing mirror 800 as appropriate, to output terminal 910.

FIGS. 10A and 10B are side and top views, respectively, of optical switch 900 in a second state (corresponding to output terminal 920). Cantilevers 112A of mirror 700A may be placed into the "down" state so that optical signal 904 is no longer reflected by reflective surface 702 of mirror 700A, but rather reflects off of the reflective surface of mirror 800, which may be oriented toward output terminal 920 as best seen in FIG. 10B. Of course cantilever 112B of mirror 700B could also be placed into the "down" position, but such a transition may not be required since optical signal 904 does not reach mirror 700B in the state shown in FIG. 10. Other embodiments of optical switches may exhibit different layouts. For example, a bi-directional switch may be fabricated by coating both sides of reflective portion 804 in mirror 800 with reflecting material.

Figure 11:
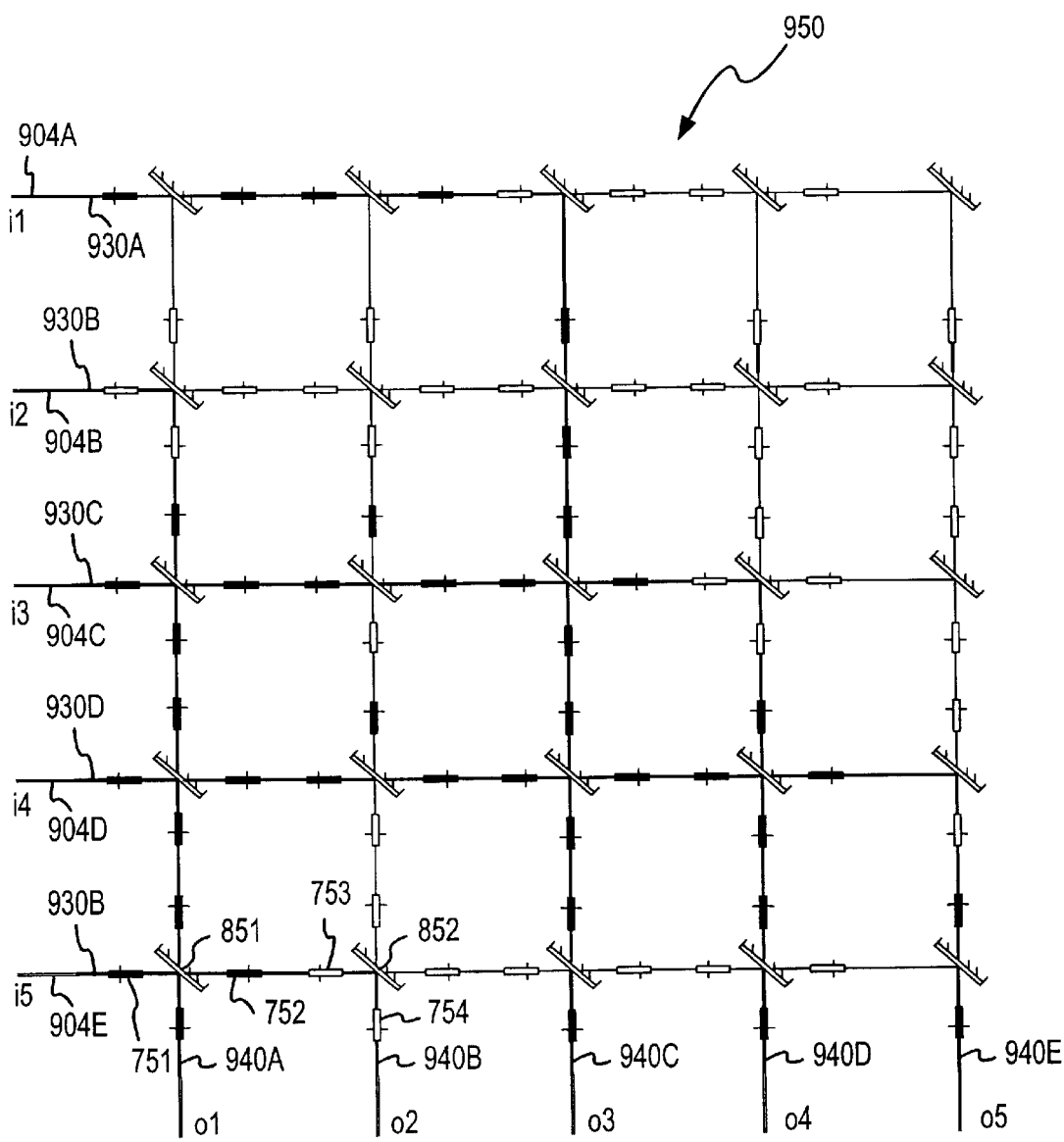
FIG. 11 is a top view of an exemplary 5×5 optical switch.

FIG. 11 is a top view of an exemplary 5×5 optical switch 950 that may be fabricated with switches 900 as described above. With reference to FIG. 11, optical signals 904A–E are received at inputs 930A–E, respectively. Each signal may be routed by switch 950 to a desired output 940A–E, as appropriate. In the exemplary switch 950 shown in the Figure, input i1 is routed to output o3, input i2 is routed to output o1, input i3 is routed to output o4, input i4 is routed to output o5, and input i5 is routed to output o2. Of course any M×N switch fabric could be formulated, where M represents the number of inputs, N represents the number of outputs, and M and N are each integers. For example, 1×4 switches, 4×8 switches, 8×16 switches, 2×2 switches, or any other switch fabric could be formulated by adjusting the number of switches 700 and 800.

With continued reference to FIG. 11, an exemplary 5×5 optical switch may include a matrix of twenty-five type II mirrors and eighty type I mirrors. The type II mirrors (shown as diagonal rectangles) may be arranged such that each input 930 has a type II mirror corresponding to each output 940. The type I mirrors (shown as smaller rectangles) are arranged as appropriate to deflect optical signals 904 around the type II mirrors as desired by reflecting the signals off of reflective layer 902 (not shown in FIG. 11, but shown in FIG. 9A). To route signal i5 to output o2, for example, type I mirrors 751 and 752 may be placed into the "up" state to deflect signal i5 around mirror 851. Type I mirrors 753 and 754 may be placed into the "down"position to allow signal i5 to deflect off of type II mirror 852 toward output 940B. As described above, the various type I mirrors may be held in the "up" or "down" states by a magnetic field generated by a magnet 102. The various mirrors may be switched between states by generating appropriate magnetic pulses via a conductor 114 (FIG. 7) or electrostatic pulses via electrodes 602/604 (FIG. 6) to create a torque that moves the appropriate cantilever 112 to create the desired state for the desired mirror.

The corresponding structures, materials, acts and equivalents of all elements in the claims below are intended to include any structure, material or acts for performing the functions in combination with other claimed elements as specifically claimed. Moreover, the steps recited in any method claims may be executed in any order. The scope of the invention should be determined by the appended claims and their legal equivalents, rather than by the examples given above. Finally, it should be emphasized that none of the elements or components described above are essential or critical to the practice of the invention, except as specifically noted herein.

What is claimed is:

1. A magnetically sensitive actuator comprising:

a magnet proximate to a substrate, wherein said magnet produces a first magnetic field;

a cantilever having a magnetic material and a longitudinal axis, said magnetic material making said cantilever sensitive to said first magnetic field that is approximately perpendicular to said longitudinal axis, wherein said cantilever is operable to rotate between a first and second state based on said first magnetic field producing a torque in said magnetic material of said cantilever that maintains said cantilever in one of said first and second states;

a conductor configured to conduct a current, wherein said current induces a torque in said cantilever based on a second magnetic field, wherein a component of said second magnetic field parallel to said longitudinal axis adjusts said direction of said torque produced by said first magnetic field in said magnetic material of said cantilever such that said conductor switches said cantilever between said first and second states; and a hinge positioned between said magnet and said cantilever that couples said cantilever to said substrate.

2. The actuator of claim 1 wherein said cantilever is approximately parallel to said substrate in said first state.

3. The actuator of claim 1 wherein said cantilever is approximately perpendicular to said substrate in said second state.

4. The actuator of claim 1 wherein said cantilever is coupled to a mirror.

5. The actuator of claim 1 wherein said conductor is coupled to said substrate.

6. The actuator of claim 1 wherein said conductor is coupled to said cantilever.

7. The actuator of claim 1 further comprising a stopper, wherein said stopper is configured to receive said cantilever in one of said first and second states.

* * * * *

UNITED STATES PATENT AND TRADEMARK OFFICE
CERTIFICATE OF CORRECTION

PATENT NO. : 6,633,212 B1 Page 1 of 1
DATED : October 14, 2003
INVENTOR(S) : Meichun Ruan et al.

It is certified that error appears in the above-identified patent and that said Letters Patent is hereby corrected as shown below:

Title page,
Item [73], Assignee, delete "AR" and add -- AZ --;
Item [57], ABSTRACT,
Line 2, delete "state" and add -- states --;

Signed and Sealed this

Eighteenth Day of May, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,633,212 B1
DATED : October 14, 2003
INVENTOR(S) : Meichun Ruan et al.

It is certified that error appears in the above-identified patent and that said Letters Patent is hereby corrected as shown below:

Column 15,
Line 4, delete "magnet" and add -- substrate --.

Signed and Sealed this

Twenty-second Day of February, 2005

JON W. DUDAS
*Director of the United States Patent and Trademark Office*